(12) United States Patent  
Hsia et al.

(10) Patent No.: US 9,793,729 B2  
(45) Date of Patent: Oct. 17, 2017

(54) UNINTERRUPTIBLE POWER SUPPLY HAVING REMOVABLE BATTERY

(71) Applicant: SCHNEIDER ELECTRIC IT CORPORATION, West Kingston, RI (US)

(72) Inventors: George Hsia, Taipei (TW); Ming Che Chan, Taoyuan (TW); Shen-Yuan Chien, Taipei (TW)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 350 days.

(21) Appl. No.: 14/589,494

(22) Filed: Jan. 5, 2015

(65) Prior Publication Data

US 2016/0197504 A1   Jul. 7, 2016

(51) Int. Cl.
*H02J 1/10* (2006.01)
*H02J 3/38* (2006.01)
*H02J 9/00* (2006.01)
*H02J 7/00* (2006.01)
*H02J 9/06* (2006.01)

(52) U.S. Cl.
CPC .......... *H02J 7/0054* (2013.01); *H02J 7/0045* (2013.01); *H02J 9/062* (2013.01); *H02J 2007/0062* (2013.01)

(58) Field of Classification Search
CPC .................. H02J 7/0045; H02J 7/0054; H02J 2007/0062; H02J 9/062
See application file for complete search history.

(56) References Cited

U.S. PATENT DOCUMENTS

| D406,100 | S | 2/1999 | Murphy |
| 6,196,851 | B1 | 3/2001 | Gerard et al. |
| D480,684 | S | 10/2003 | Ho |
| D482,653 | S | 11/2003 | Cho |
| D506,976 | S | 7/2005 | Dechene et al. |
| 6,923,676 | B2 | 8/2005 | Perry |

(Continued)

OTHER PUBLICATIONS

Notification of Transmittal of the International Search Report and the Written Opinion of the International Searching Authority from corresponding PCT/US2016/012040 dated Mar. 18, 2016.

*Primary Examiner* — Jared Fureman
*Assistant Examiner* — Esayas Yeshaw
(74) *Attorney, Agent, or Firm* — Lando & Anastasi, LLP

(57) ABSTRACT

A UPS includes a battery contained within a battery housing. The battery housing has a first connector mounted on the battery housing. The UPS further includes a housing having a battery compartment for removably containing the battery housing of the battery. The housing has a second connector mounted within the battery compartment. The second connector is configured to mate with the first connector. The UPS further includes a first input configured to receive input power from an AC power source and at least one output configured to provide output AC power derived from the input power in a first mode of operation and configured to provide output power derived from the at least one battery module in a second mode of operation. The battery housing has a third connector configured to be coupled to a mobile device to provide power to the mobile device.

19 Claims, 15 Drawing Sheets

(56) References Cited

U.S. PATENT DOCUMENTS

| | | | |
|---|---|---|---|
| 7,202,576 B1 * | 4/2007 | Dechene | H02J 9/06 307/66 |
| 7,626,356 B2 | 12/2009 | Elgie et al. | |
| D648,676 S | 11/2011 | Brookshire et al. | |
| D661,249 S | 6/2012 | Smith et al. | |
| D670,243 S | 11/2012 | McGuire | |
| 8,686,683 B2 * | 4/2014 | Caskey | H01R 13/6675 320/107 |
| D711,821 S | 8/2014 | Wang | |
| 2005/0029984 A1 * | 2/2005 | Cheng | H02J 7/0045 320/107 |
| 2008/0079388 A1 * | 4/2008 | Sarnowsky | H02J 7/0042 320/103 |
| 2008/0116748 A1 * | 5/2008 | Yeh | H01M 2/1016 307/66 |
| 2010/0088843 A1 * | 4/2010 | Reed | A47L 9/2857 15/389 |
| 2010/0213892 A1 * | 8/2010 | Desanctis | H01R 25/006 320/107 |
| 2010/0244567 A1 | 9/2010 | Brookshire et al. | |
| 2010/0264877 A1 | 10/2010 | Ashida | |
| 2011/0076874 A1 | 3/2011 | Fleisig | |
| 2011/0084660 A1 | 4/2011 | McSweyn | |
| 2011/0148197 A1 * | 6/2011 | Hernandez | H02J 9/061 307/26 |
| 2011/0304211 A1 * | 12/2011 | Peterson | G06F 1/263 307/48 |
| 2013/0033223 A1 | 2/2013 | Liu | |
| 2014/0111143 A1 | 4/2014 | Sells et al. | |
| 2015/0015075 A1 * | 1/2015 | Toya | H02J 9/06 307/66 |
| 2015/0061385 A1 * | 3/2015 | Nommensen | H02J 9/06 307/23 |
| 2015/0171386 A1 | 6/2015 | Yang et al. | |
| 2015/0207351 A1 * | 7/2015 | Hamburgen | H02J 7/0044 320/114 |
| 2016/0197504 A1 | 7/2016 | Hsia et al. | |

* cited by examiner

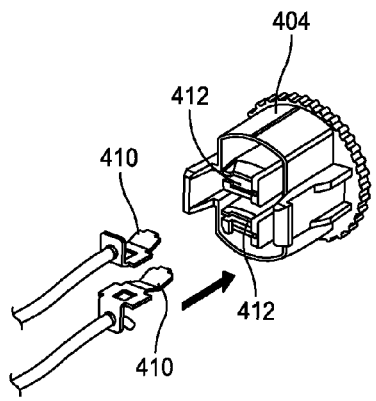
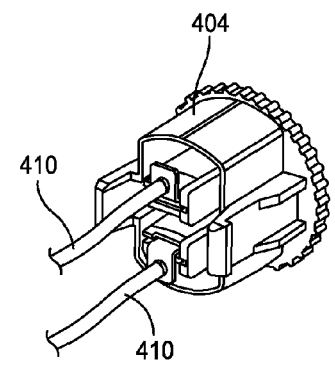
FIG. 16A  FIG. 16B
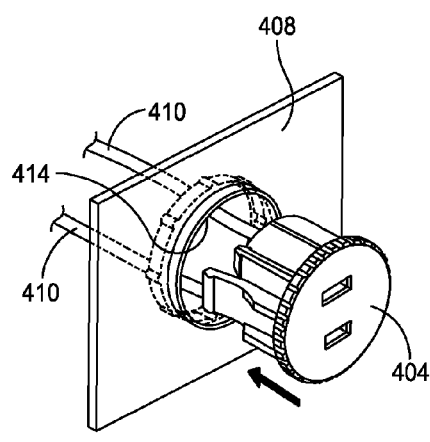
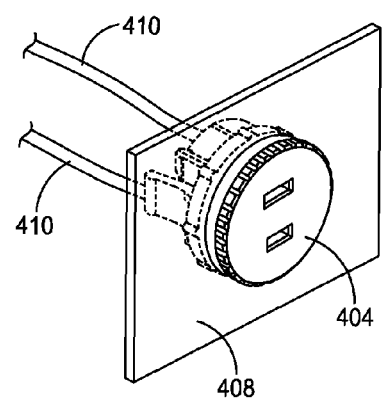
FIG. 17A  FIG. 17B

UNINTERRUPTIBLE POWER SUPPLY HAVING REMOVABLE BATTERY

RELATED APPLICATION

This application relates to U.S. Design patent application Ser. No. 29/513,728 entitled UNINTERRUPTIBLE POWER SUPPLY AND MOBILE POWER BANK, by George Hsia, Ming Che Chan, and Justin DeSilva, filed on even date herewith and incorporated herein by reference.

BACKGROUND OF DISCLOSURE

1. Field of Disclosure

Embodiments of the disclosure relate generally to power devices, and more specifically to a power device, including an uninterruptible power supply and a surge protector, having a removable battery that is designed to power mobile electronic equipment when removed from the power device.

2. Discussion of Related Art

Mobile devices, such as smart phones and tablets, are widely used in home and small business environments. Mobile devices are useful in keeping their users connected to Internet-based services, such as email, social media, entertainment media and services that are capable of controlling other devices, such as thermostats and lightning equipment. Loss of power service to a home or a small business limits a user's availability to connect to the Internet and ultimately disrupts the user's availability of the mobile device.

SUMMARY OF DISCLOSURE

One aspect of the present disclosure is directed to an uninterruptible power supply ("UPS") comprising a battery contained within a battery housing. The battery has at least one battery module within the battery housing and is configured to provide battery power. The battery housing has a first connector mounted on the battery housing. The UPS further comprises a housing having a battery compartment for removably containing the battery housing of the battery. The housing has a second connector mounted within the battery compartment. The second connector is configured to mate with the first connector. The UPS further comprises a first input configured to receive input power from an AC power source and at least one output configured to provide output AC power derived from the input power in a first mode of operation and configured to provide output power derived from the at least one battery module in a second mode of operation. The battery housing has a third connector configured to be coupled to a mobile device to provide power to the mobile device.

Embodiments of the UPS further may include a plurality of mounting tabs. Each of the plurality of mounting tabs may be removably coupled to the housing, with the housing being configured to receive each of the plurality of mounting tabs at one of a plurality of mounting locations on the housing to selectively configure the UPS in one of a plurality of mounting orientations. The battery may be configured to charge a mobile device coupled to the third connector with the battery removed from the battery compartment. The third connector may be a USB connector. The battery housing may have a fourth connector configured to be coupled to a power source to charge the at least one battery module with the battery removed from the battery compartment. The at least one output may include a plurality of output connectors mounted to the housing, with each of the plurality of output connectors being rotatable with respect to the housing to receive a power cord at a plurality of orientations. The UPS may be configured in the first mode of operation to provide charging power to the battery to charge the at least one battery module. One of the first connector and the second connector may have a plurality of pins each having a length, and one of the first connector and the second connector may include a plurality of sockets for mating with the plurality of pins, with the length of one pin of the plurality of pins being less than the lengths of at least two pins of the plurality of pins. The UPS may include a detection circuit to detect mating of the one pin with a corresponding socket of the plurality of sockets and enable charging of the battery module in response.

Another aspect of the disclosure is directed to a method of providing power to a plurality of devices. In one embodiment, the method comprises: operating a UPS in a first mode of operation to provide AC power derived from input AC power to a first device; inserting a battery into a housing of the UPS; operating the UPS in a second mode of operation to provide AC power derived from DC power from the battery to the first device; removing the battery from the housing; and with the battery removed from the housing, charging a mobile device using the battery.

Embodiments of the method further may include charging the battery in the first mode of operation. Inserting a battery into a housing of the UPS may include mating a first connector having a plurality of pins each having a length with a second connector having a plurality of sockets, with one of the plurality of pins having a length that is less than the lengths of at least two pins of the plurality of pins. The method further may include detecting that the one of the plurality of pins has mated with a corresponding socket of the plurality of sockets, and in response, charging the battery. Charging a mobile device may include charging the mobile device using a USB connector mounted to a housing of the battery. The method further may include charging the battery while the battery is removed from the housing. The UPS may have at least one output connector mounted on a housing of the UPS. The method further may include rotating the output connector with respect to the housing from a first rotational position to a second rotational position, and coupling a power cord to the output connector. The UPS may include a housing and a plurality of removable mounting tabs, and wherein the method further includes moving at least one of the plurality of mounting tabs from a first position on the housing to a second position on the housing, and mounting the housing to a wall.

A further aspect of the disclosure is directed to a UPS comprising a battery contained within a battery housing. The battery has at least one battery module within the battery housing and configured to provide battery power. The battery housing has a first connector mounted on the battery housing. The UPS further comprises a housing having a battery compartment for removably containing the battery housing of the battery. The housing has a second connector mounted within the battery compartment, with the second connector being configured to mate with the first connector. The UPS further comprises a first input configured to receive input power from an AC power source and at least one output configured to provide output AC power derived from the input power in a first mode of operation and configured to provide output power derived from the at least one battery module in a second mode of operation. The battery includes means for charging a mobile device with the battery removed from the battery housing.

Embodiments of the UPS further may include means for charging the battery in the first mode of operation, means for detecting proper insertion of the battery into the battery housing and enabling charging of the battery module in response, and means for selectively configuring the uninterruptible supply in a desk top configuration and a wall mount configuration. The at least one output may include a plurality of output connectors mounted to the housing, with each of the plurality of output connectors being with respect to the housing to receive a power cord at a plurality of orientations.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 16A and 16B are perspective views of a connection of wires to the rotatable outlet;

FIGS. 17A and 17B are perspective views of the rotatable outlet being secured to a housing of a UPS;

DETAILED DESCRIPTION

Figure 1:
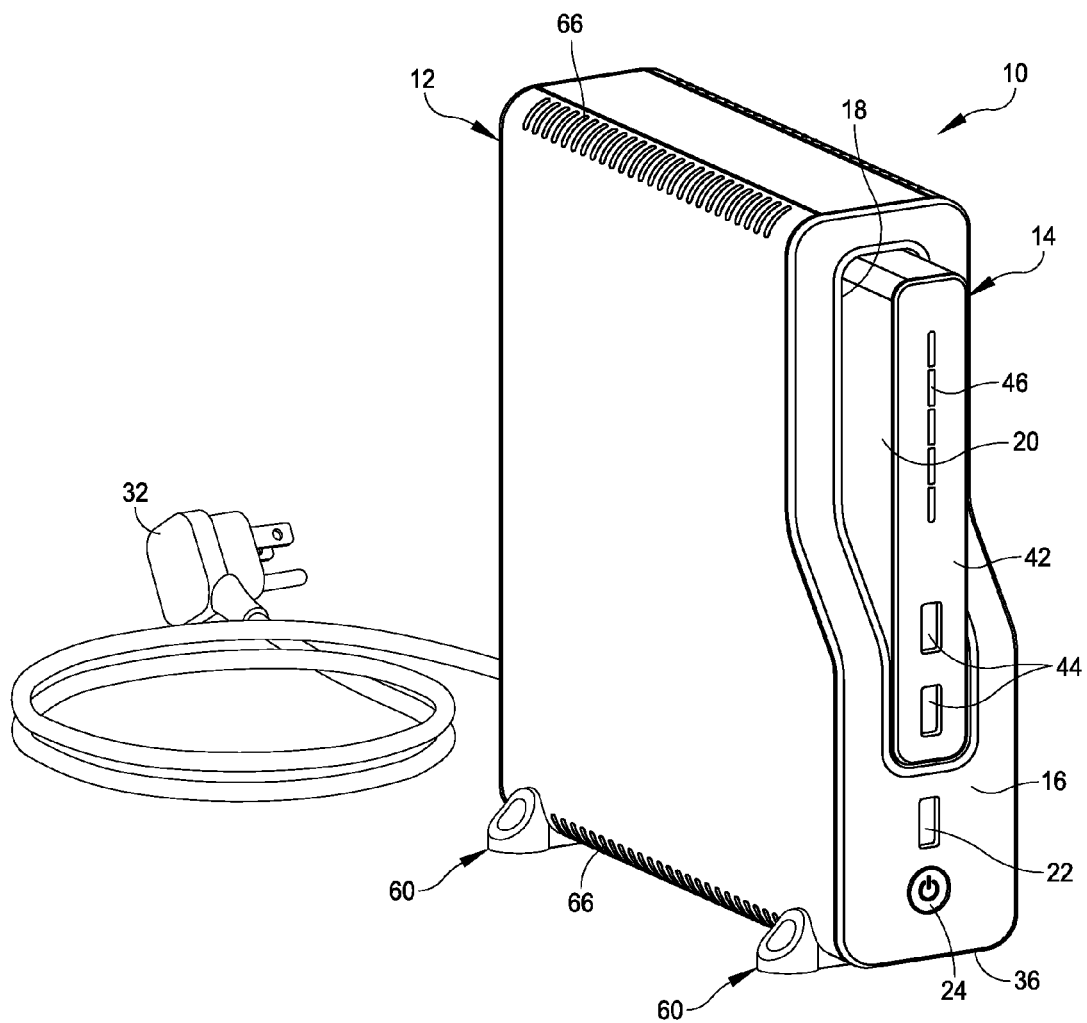
FIG. 1 is a front perspective view of a device of an embodiment of the present disclosure having a battery contained within a battery compartment of a housing of the device.

Examples of the methods and systems discussed herein are not limited in application to the details of construction and the arrangement of components set forth in the following description or illustrated in the accompanying drawings. The methods and systems are capable of embodiment in other embodiments and of being practiced or of being carried out in various ways. Examples of specific embodiments are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

A typical uninterruptible power supply ("UPS") provides power backup and surge protection to electronic devices that need AC power. However, a UPS battery energy source is commonly fixed within the UPS body, and cannot be made portable for other purposes, such as recharging mobile devices. Further, general-purpose UPSs and their batteries are large and bulky, typically due to the lead-acid battery deployed, and the AC power socket surfaces designed to accommodate various electronic devices. There is presently needed a convenient and compact way of providing backup power to Internet gateway equipment and, when traveling, backup power to mobile devices, and for providing power to AC powered devices (e.g., Internet gateway devices) and DC powered devices (e.g., mobile devices).

One aspect of the disclosure is the provision of a device, such as a UPS, which is designed to maximize the convenience and mobility of a backup power energy source. The UPS includes a removable battery that is configured to provide necessary backup functions into the environment of the Internet gateway equipment, while also providing a convenient charging function to local mobile devices that recharge from Universal Serial Bus ("USB") ports. To do this, the UPS is designed to power Internet gateway equipment using AC power when available and provide battery backup power using a dockable, portable lithium battery. In addition, in some embodiments the UPS includes surge suppression circuits to protect the gateway equipment from surges caused by lightning or other electrical disturbances regardless of the state of the mobile battery, whether inserted or not inserted. The UPS further is provided with rotatable AC power sockets to allow a compact design, while adapting to the various forms and shapes of adapter plugs that come with gateway equipment. The UPS can further include battery charging and USB charging ports, which replace bulky separate AC/DC USB charging adapters.

Figure 2:
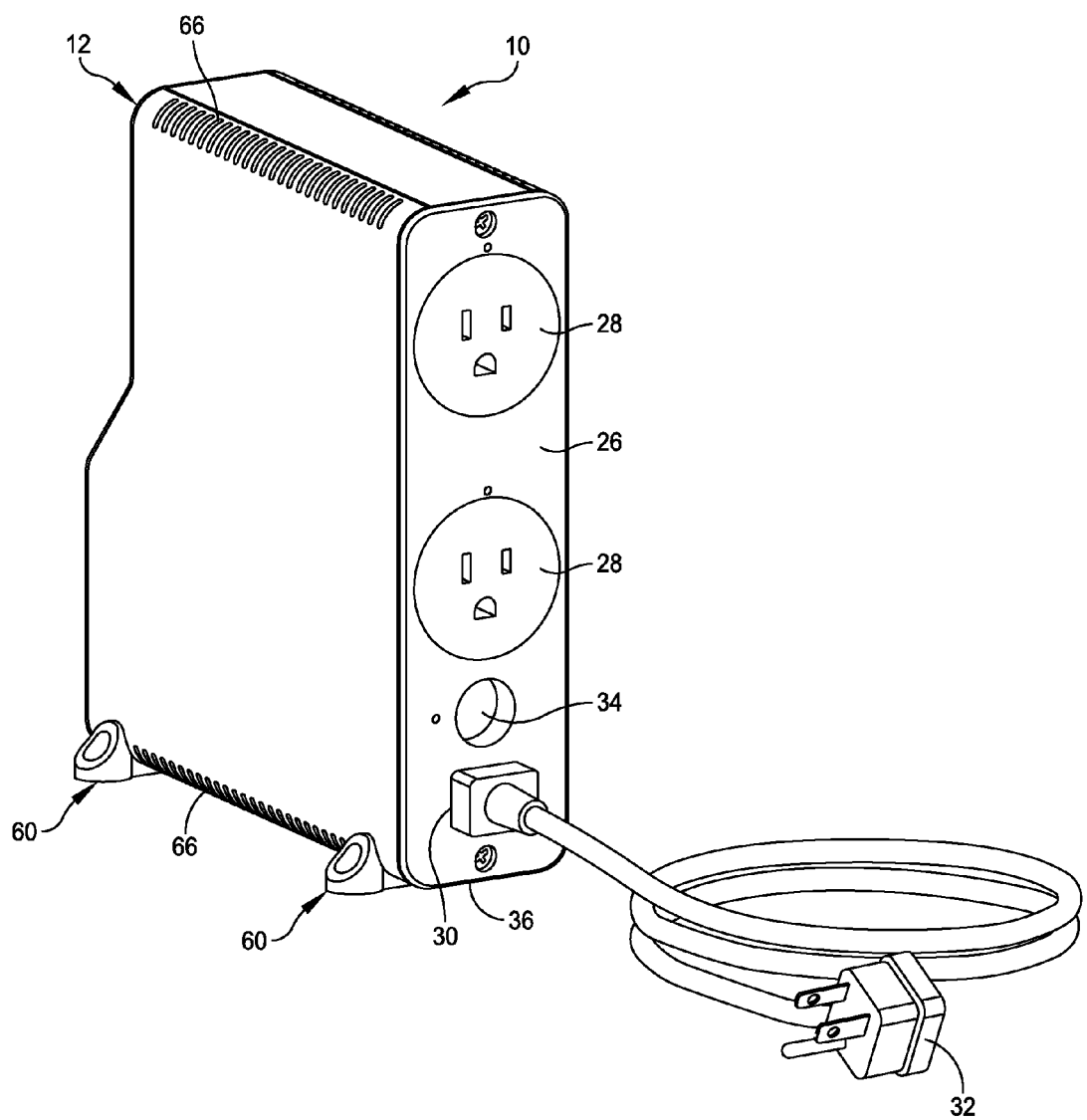
FIG. 2 is a back perspective view of the device shown in FIG. 1.

Referring to the drawings, and more particularly to FIGS. 1 and 2, there is generally indicated at 10 a UPS of an embodiment of the present disclosure. In one embodiment, the UPS 10 includes a primary or main housing, generally indicated at 12, and a battery, generally indicated at 14, which is removably secured to the housing in the manner provided below. As discussed herein, the UPS 10 is used to provide backup power to an electrical device, or load, when the primary power source, or mains, fails. Typical loads for the UPS 10 disclosed herein include the Internet gateway devices described herein, such as mobile phones and tablets, and other electronic equipment, such as routers. When AC mains power is unavailable, DC power provided by the battery is converted to AC power by a power converter circuit, which in turn is provided to the load. A battery charger, which converts AC power to DC power, may be included in the UPS to charge the battery when AC mains is available to ensure that backup power will be available when needed. The UPS may also include a control unit for automatically managing the operation of the UPS and the power conversion functions.

Figure 3:
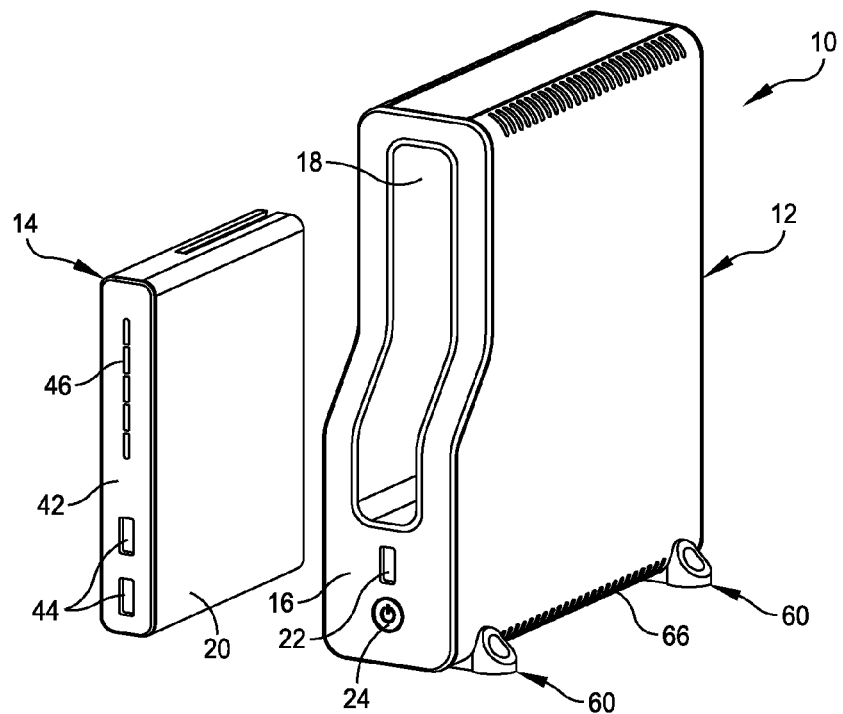
FIG. 3 is a front perspective view of the device showing the battery removed from the battery compartment of the housing of the device.

As shown in FIG. 1, the housing 12 of the UPS 10 includes a front wall 16 having a battery compartment 18 formed therein for removably receiving and containing a battery housing 20 of the battery 14 when charging the battery. FIG. 3 shows the battery 14 removed from the housing 12 of the UPS 10 to reveal an open battery compartment 18. The front wall 16 of the housing 12 further includes a USB port 22 configured to receive a USB plug and an ON/OFF power switch 24 to power the UPS 10 on and off, when pressed. In FIG. 2, the housing 12 of the UPS 10 further includes a back wall 26 having two rotatable AC power outlets, each indicated at 28, each of which provides a relatively compact design while adapting to the various forms and shapes of adapter plugs that come with gateway equipment. Each AC power outlet 28 is rotatable with respect to the housing 12 of the UPS 10 to receive a power cord at a desired orientation. The back wall 26 of the housing 12 further includes an AC input port 30, which is configured to receive a power cord 32, and a circuit breaker 34. The AC input port 30 and the power cord 32 are configured to receive input power from an AC power source, such as an outlet, to provide AC power to the UPS 10.

Figure 4:
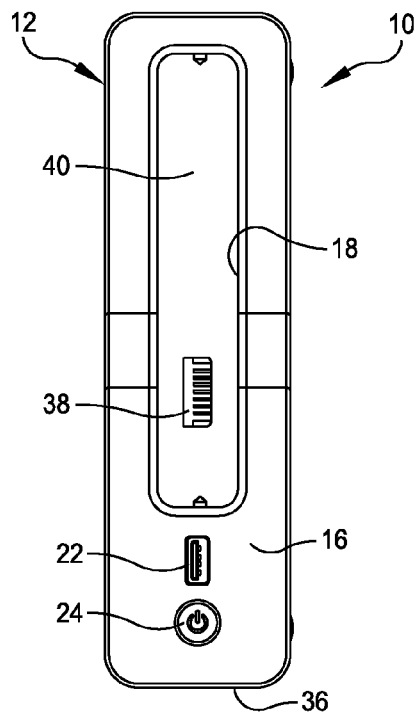
FIG. 4 is a front elevational view of the device with the battery removed from the device.

Referring to FIGS. 3 and 4, the housing 12 of the UPS 10 is configured to assume the shown upright position in which a narrow bottom wall 36 of the housing rests on a flat surface or, as will be described in greater detail below, another preferred position or orientation. With the battery 14 removed from the battery compartment 18 of the housing 12 of the UPS 10, the housing 12 includes a connector 38 that is mounted on an inner wall 40 of the battery compartment. The connector 38 is best shown in FIG. 4, and is designed to mate with another connector (e.g., connector 54 shown in FIG. 5B) associated with the battery in a manner described below. The arrangement is that when the battery 14 is firmly seated within the battery compartment 18 of the housing 12, the connector 38 associated with the UPS 10 and the connector associated with the battery mate to provide power from the UPS to the battery to charge the battery and to receive power from the battery in a backup mode of operation. The battery compartment 18 is sized and shaped to enable the battery 14 to slide within the battery compartment so that the connector of the battery mates with the connector 38 of the UPS 10.

Figure 5A:
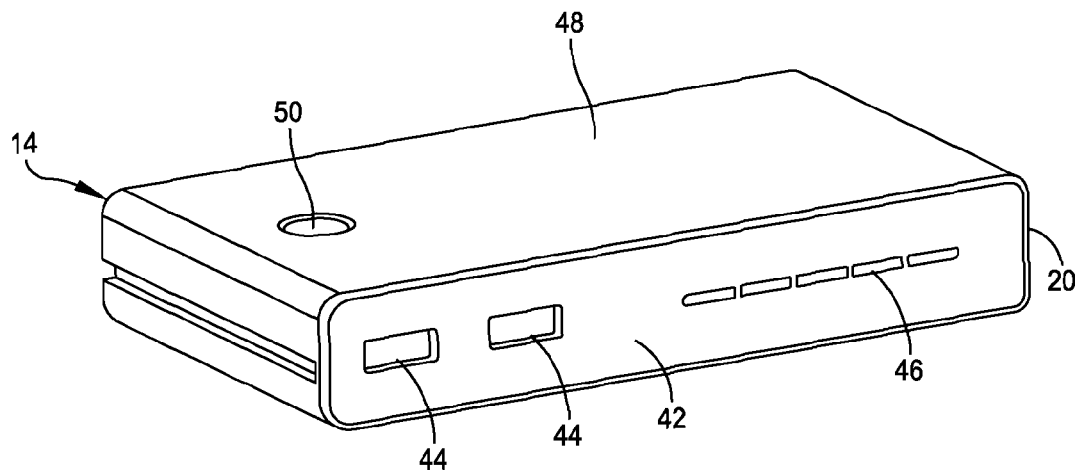
FIG. 5A is a front perspective view of the battery.
Figure 5B:
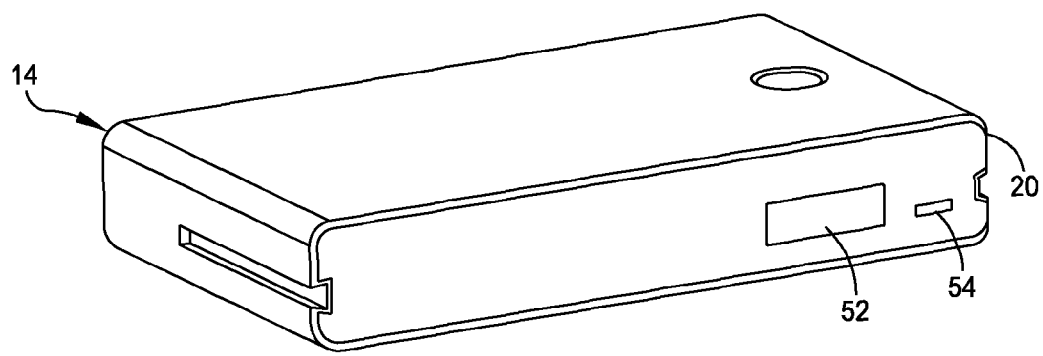
FIG. 5B is a back perspective view of the battery.

Referring to FIGS. 5A and 5B, and in particular FIG. 5A, the battery housing 20 of the battery 14 includes a front surface 42 having two USB ports, each indicated at 44, and a series of power indicator lights, each indicated at 46, to indicate relative charge of the battery by percentage. In the shown embodiment, the battery 14 includes five power indicator lights 46, with one light representing approximately 20% charge of the battery. The USB ports 44 can be used to power remote devices when the battery 14 is disposed within the housing 12 of the UPS 10 and when the battery is removed from the housing of the UPS. A top surface 48 of the battery housing 20 includes a power ON/OFF button 50, which powers the battery on and off when pressed. While the shown embodiment includes USB ports, other types of connectors may also be used depending on the type of device to be powered through the ports.

As shown in FIG. 5B, the battery housing 20 of the battery 14 further includes a back surface 52 having a connector 54 that mates with the connector 38 of the housing 12 of the UPS 10 when the battery is inserted into the battery compartment 18. In one embodiment, the battery connector 54 embodies a 7-blade connector, which will be described in greater detail below with reference to FIGS. 11A-11C. The back surface 52 of the battery housing 20 further includes a micro-USB port 56, which may be accessible when the battery 14 is removed from the housing 12 of the UPS 10. When being used as a portable battery to recharge mobile devices, the battery 14 can be recharged using any typical USB charger having a micro-USB connector that is plugged into the micro-USB port 56. Instead of needing to purchase and carry multiple UPS, mobile battery and charging adapter devices, the UPS 10 embodies a single, compact and convenient device having a universally adaptable battery 14 that is portable and docks with the battery compartment 18 of the UPS. In one embodiment, the UPS 10 is relatively compact in construction having a height of 196 millimeters ("mm"), a width of 54 mm, and a depth of 177 mm, with the battery 14 having a height of 130 mm, a width of 22 mm, and a depth of 74 mm The size and shape of the UPS 10 and the battery 14 can be modified based on the environment in which they operate.

Figure 6:
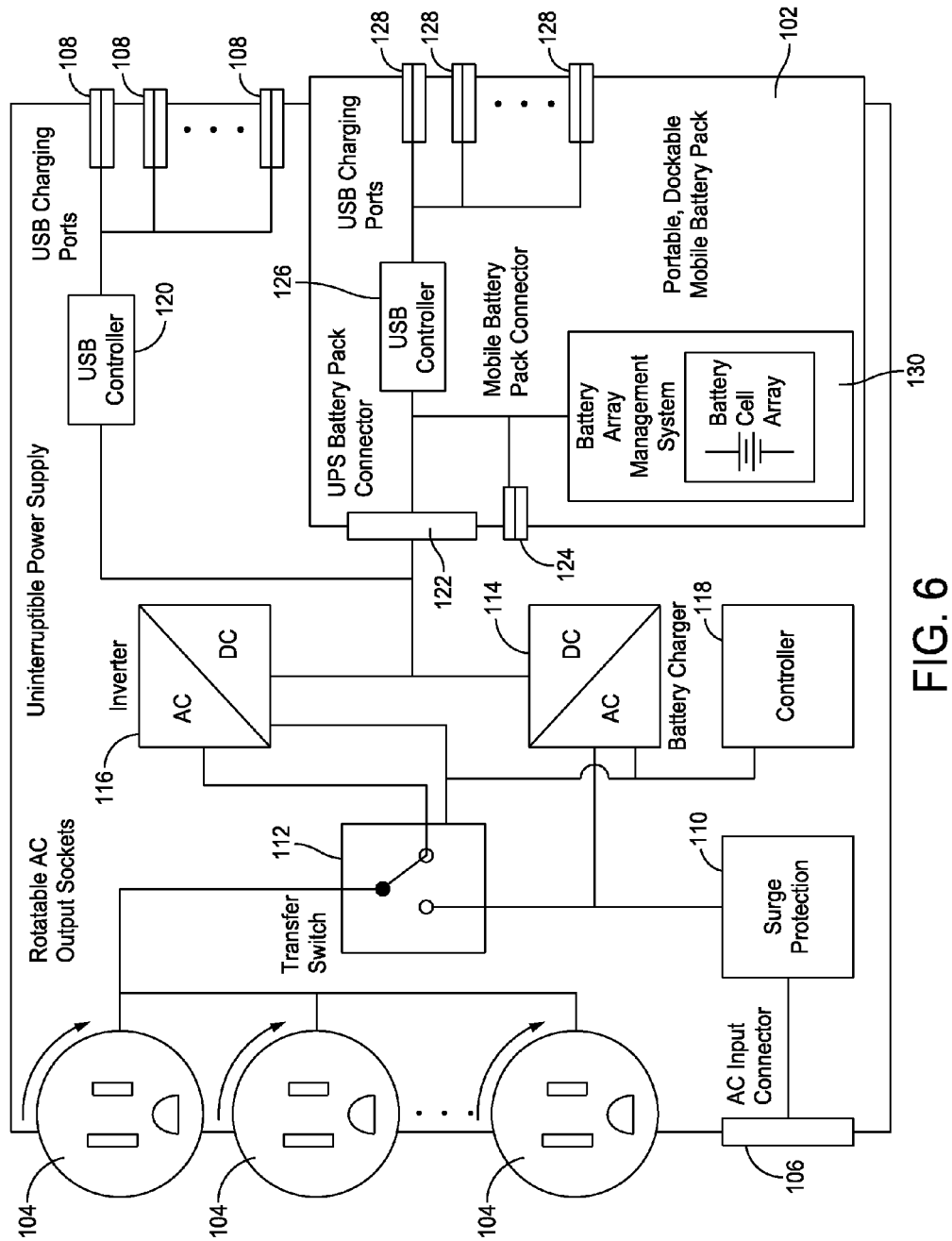
FIG. 6 is a schematic diagram of an electronic configuration of the device.

A schematic diagram of a UPS 100, in accordance with one embodiment, is shown in FIG. 6. UPS 100 differs from UPS 10 in that UPS 100 includes more output AC connectors and USB charging ports than UPS 10, but otherwise UPS 100 is similar to UPS 10 and may be packaged in a similar manner. Also, the UPS 10, may be implemented using the schematic diagram of FIG. 6 without the additional connectors.

The UPS 100 includes a mobile battery pack 102, output AC connectors, each indicated at 104, an input AC connector 106, and output USB charging ports, each indicated at 108. The UPS 100 also includes a surge protector 110, a transfer switch 112, a battery charger 114, an inverter 116, a controller 118, and a USB controller 120. The mobile battery pack 102 includes a UPS interface connector 122, a mobile charging input connector 124, a USB controller 126, USB charging ports, each indicated at 128, and a battery module 130 that includes a battery array management system and an array of battery cells.

In a first mode of operation of the UPS 100, when AC power is available at the input AC connector 106, the transfer switch 112, under control of the controller 118, couples the surge protector 110 to the output AC connectors 104 to provide AC power to devices coupled to the output AC connectors. The surge protector 110 protects the UPS 100 and the devices coupled to the output AC connectors 104 from potentially harmful disturbances in the AC power.

In the first mode of operation, the battery charger 114, under control of the controller 118, provides power to charge the battery cell array as necessary. The battery charger 114 also provides DC power to the USB controller 120. The USB controller 120 receives the DC power from the battery charger 114 and provides DC power at the USB charging ports 128 to power and/or charge USB devices. In the first mode of operation, the inverter 116 is not used.

As with the UPS 10, the battery pack 102 of UPS 100 is removable. With the battery pack 102 removed, the UPS 100 is still able to operate in the first mode of operation to provide output AC power at the output AC connectors 104.

In a second mode of operation, when AC power is not available at the input AC connector 106, the controller 118 controls the transfer switch 112 to couple the inverter 116 to the output AC connectors 104. In this mode of operation, DC power from the battery pack 102 is converted to AC power in the inverter 116 and provided at the output AC connectors 104.

When the battery pack 102 is removed from the UPS 100, the USB controller 126 of the battery pack provides DC power from the battery module 130 to charge mobile electronic devices coupled to one of the USB charging ports 128. With the battery pack 102 removed, the battery module 130 can be charged using input power from a mobile electronic device charger coupled to the mobile charging input connector 124.

In the uninterruptible power supply 100, the controller 118 controls functions of the UPS as discussed above. The controller 118 can include hardware, software, firmware, a processor, a memory, an input/output interface, a data bus, and/or other elements in any combination that may be used to perform the respective functions of the controller.

In embodiments discussed above, uninterruptible power supplies include a removable battery pack that functions as a portable mobile electronics charger. In the embodiments discussed above, with the battery pack removed, the UPS is not able to provide backup power. In other embodiments, UPSs are implemented having multiple packs that are separately removable from the UPS. In these embodiments, the UPS can still function to provide backup power as long as one battery pack is contained in the UPS.

Figure 7:
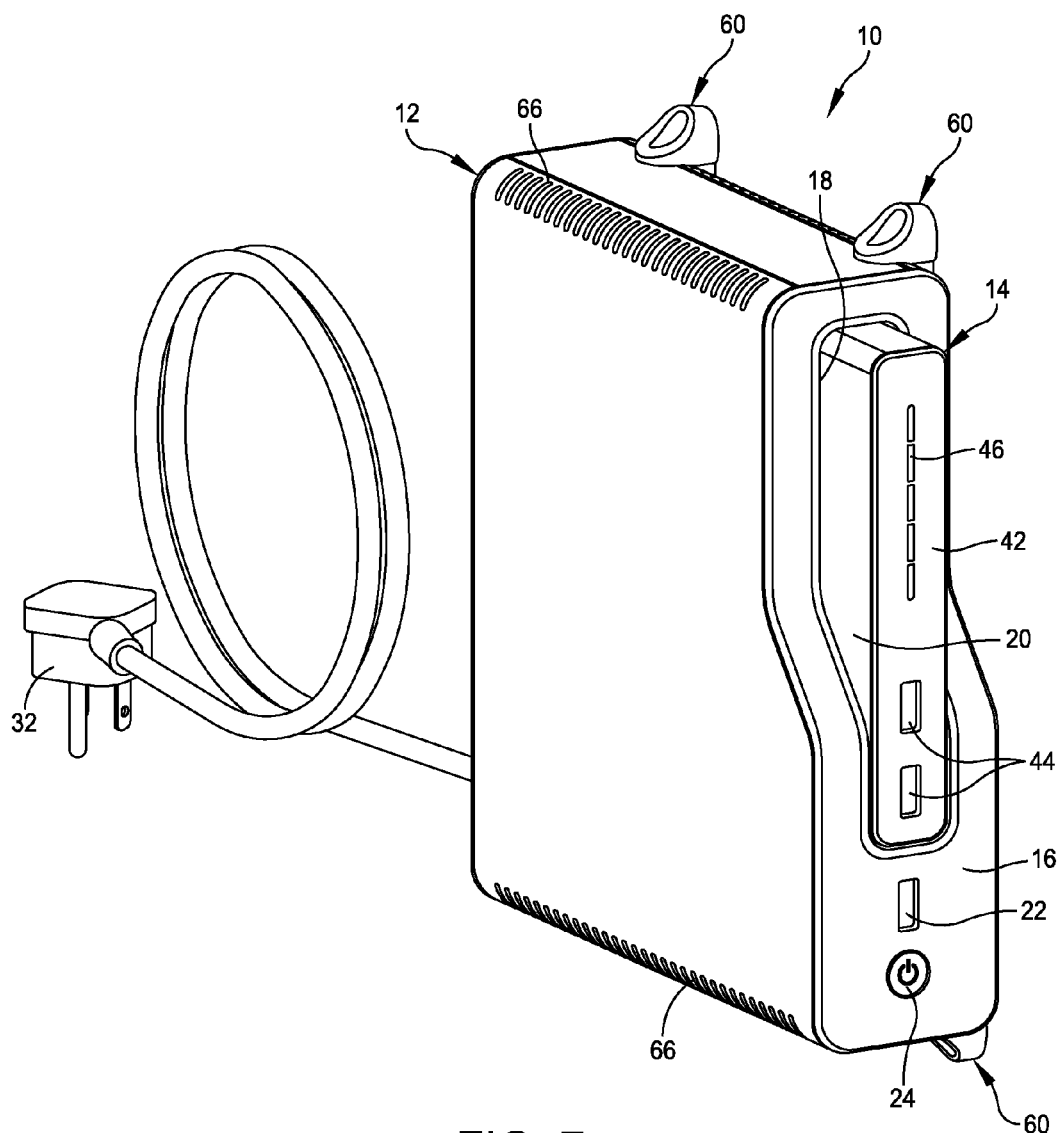
FIG. 7 is a front perspective view of the device shown in FIG. 1 having an alternative mounting configuration.

The UPS of embodiments of the present disclosure can be configured to mount in one of many mounting orientations. With the embodiment shown in FIGS. 1-3, the housing 12 of the UPS 10 is in an upright position in which the narrow bottom wall 36 of the housing 12 rests on a flat surface. In one embodiment, the housing 12 of the UPS 10 includes several mounting tabs, each generally indicated at 60, which are releasably secured to the housing of the UPS. In the example shown in FIGS. 1-3, the mounting tabs 60 are releasably secured to the housing 12 of the UPS 10 adjacent the narrow bottom wall 36 of the housing to enable the housing to rest in an upright position on a flat surface. Referring to FIG. 7, the mounting tabs 60 are releasably secured to the housing 12 of the UPS 10 adjacent a relatively larger side wall to enable the UPS to be mounted on a vertical surface, such as an interior wall of a room. The mounting tabs 60 can be releasably secured to the housing 12 of the UPS 10 in any number of locations to achieve one of several mounting orientations.

Figure 8A:
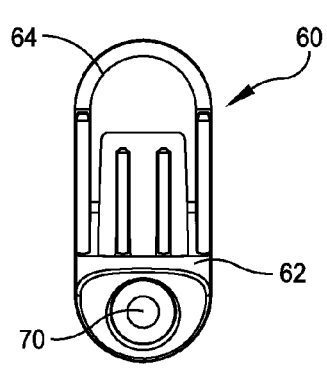
FIG. 8A is a front elevational view of a mounting tab used to secure the device to an object.
Figure 8B:
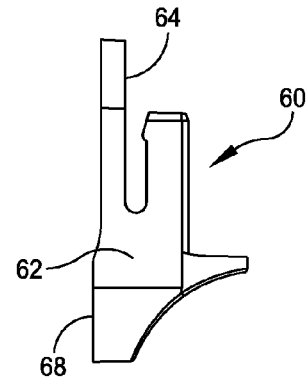
FIG. 8B is a side elevational view of the mounting tab.

Referring to FIGS. 8A and 8B, each mounting tab 60 includes a body 62 having a U-shaped structure 64, which includes a tab that is designed to clip onto edges of the housing having a series of grooves 66 sized to receive the tab of the U-shaped structure. In one embodiment, each groove 66 includes a small protrusion that interacts with the tab of the U-shaped structure 64 to releasably connect the mounting tab 60 to the housing 12 of the UPS 10. The body 62 of the mounting tab 60 further includes a flat surface 68 and an opening 70 formed therein, with the opening extending through the flat surface in a direction that is generally perpendicular to a direction of the U-shaped structure 64. The opening 70 is sized to receive a fastener, such as a screw fastener, to secure the mounting tab 60 and the UPS 10 to an object or structure. When the mounting tabs 60 are secured to the housing 12 of the UPS 10, the flat surfaces 68 of the mounting tabs lie along a common plane to provide contact surfaces to engage a surface on which the UPS is to be secured or rested upon. The mounting tabs 60 may be provided along any edge of the housing 12 of the UPS 10 to orient and mount the UPS in a desired position.

Figure 9:
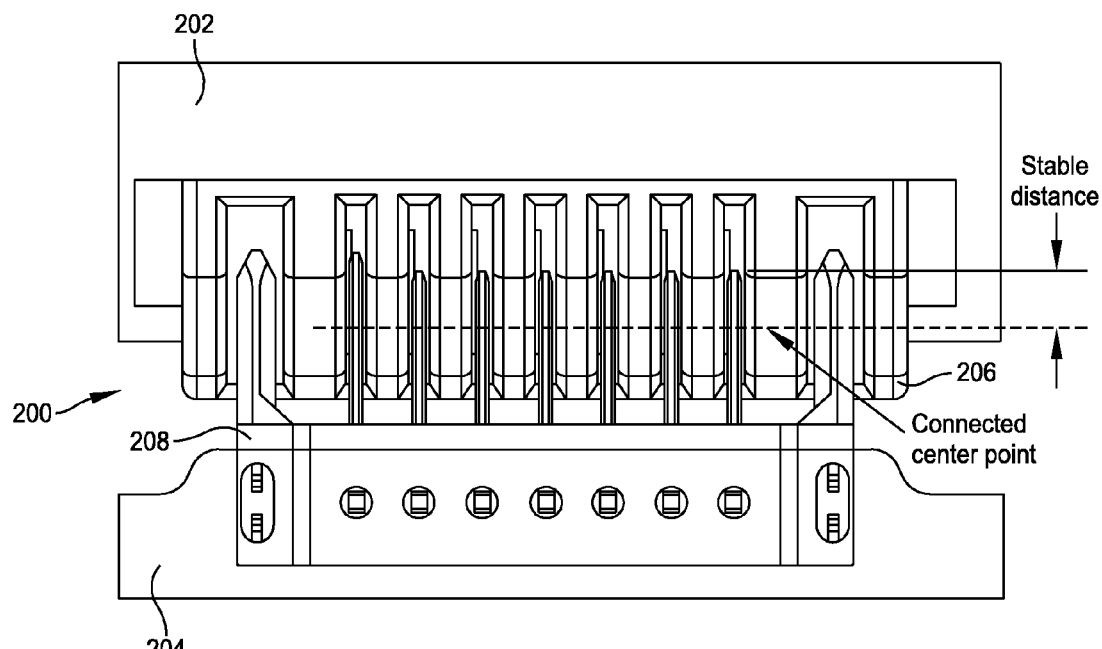
FIG. 9 is a cross-sectional view of a prior art mating connector used to electrically connect the battery to the device, the mating connector being shown in a completely connected position.
Figure 10:
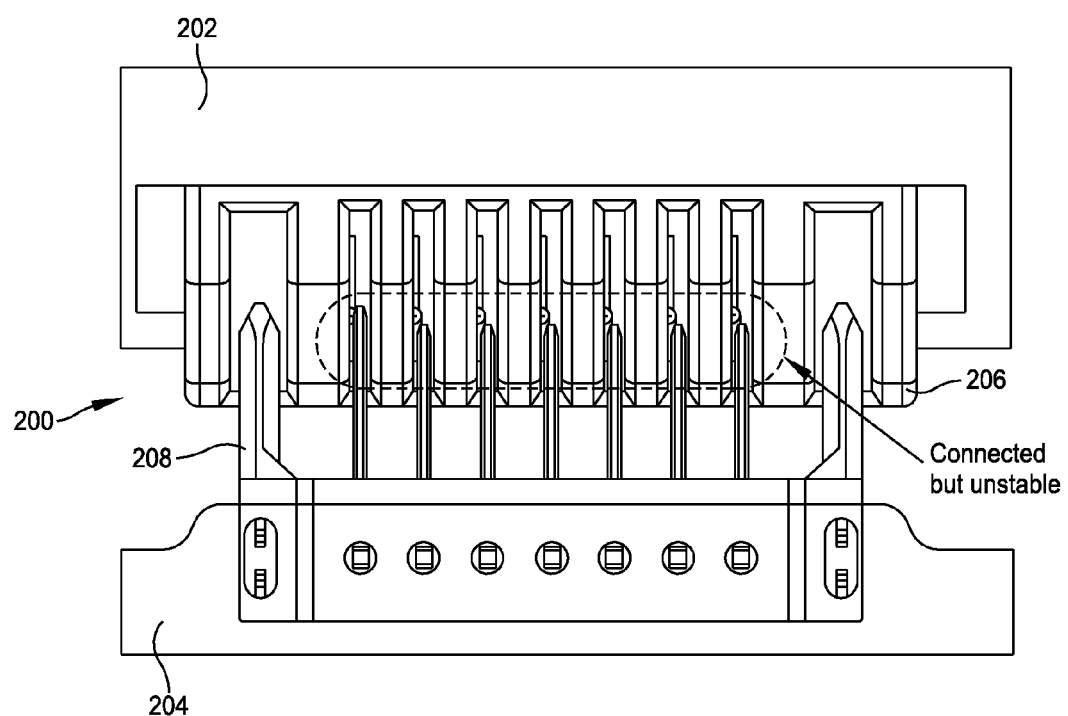
FIG. 10 is a cross-sectional view of the prior art mating connector shown in a partially connected position.

Referring to FIGS. 9 and 10, there is illustrated a prior art two-part, mating connector, generally indicated at 200, used to electrically connect a battery 202 to a device 204. FIG. 9 illustrates the mating connector 200 being shown in a completely connected position. In the application of a general battery connector having an external battery connected to a system, the mating connector must be settled in stable and reliable connection, which is shown in FIG. 9. In this condition, the connection between the mating parts 206, 208 of the connector 200 must retain a certain safe distance, with a contact center of the connector retaining a certain safe distance from disengagement. The connection between the mating parts 206, 208 of the connector 200 can withstand a certain amount of vibration or shaking applied to the connector. The contact points between the mating parts 206, 208 of the connector 200 remain in touch.

FIG. 10 illustrates the mating parts 206, 208 of the connector 200 in a partially connected position. This condition may occur when the mating parts 206, 208 of the connector 200 initially contact one another and maintain an initial contact, but are not completely connected. In such a condition, the device 204 may not detect a gap between the mating parts 206, 208 of the connector 200 and continue to operate normally to supply current through the pin contacts of the mating parts of the connector. However, since the mating parts 206, 208 of the connector 200 are not fully connected, the gap between the mating parts may widen, thereby causing the electrical connection between the mating parts to be disrupted. This condition may cause a serious thermal issue or even cause a short circuit as the unreliable contact may result in a high contact resistance causing heat to be generated by the relatively high charging current through the connector.

Figure 11A:
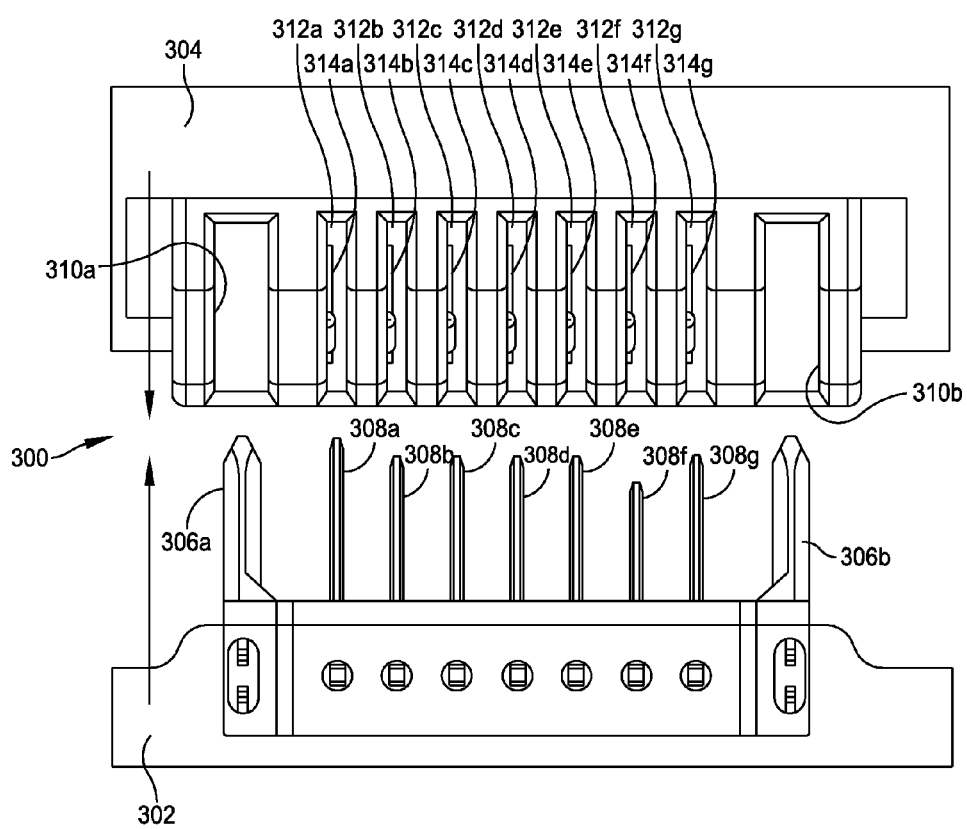
FIG. 11A is cross-sectional view of a mating connector of an embodiment of the present disclosure used to connect the battery to the device, the mating connector being shown in a completely separated position prior to connection with one another.
Figure 11B:
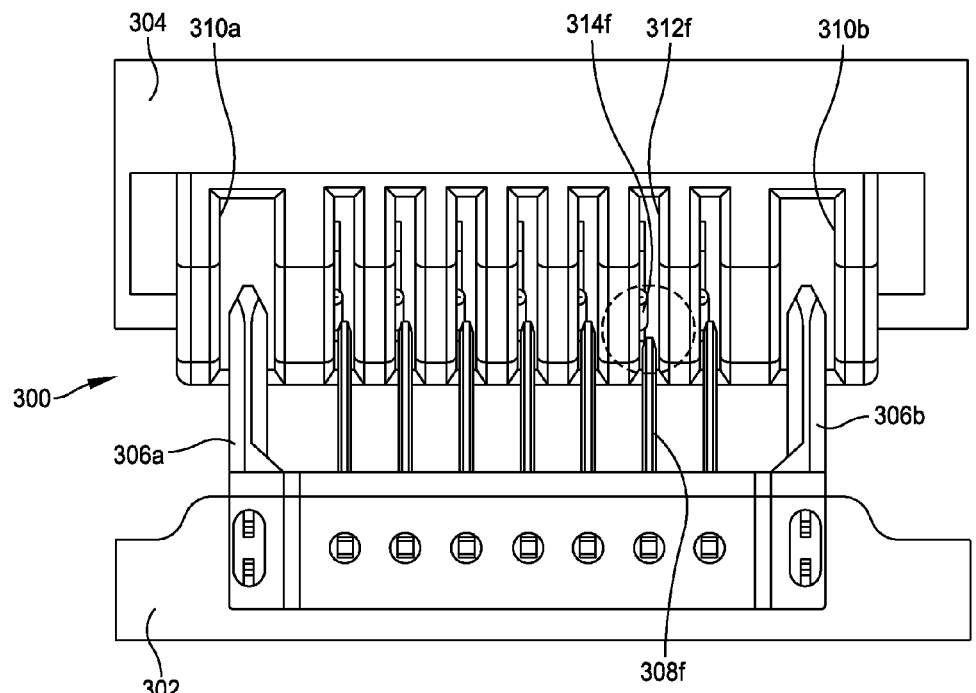
FIG. 11B is a cross-sectional view of the mating connector shown in a partially connected position.
Figure 11C:
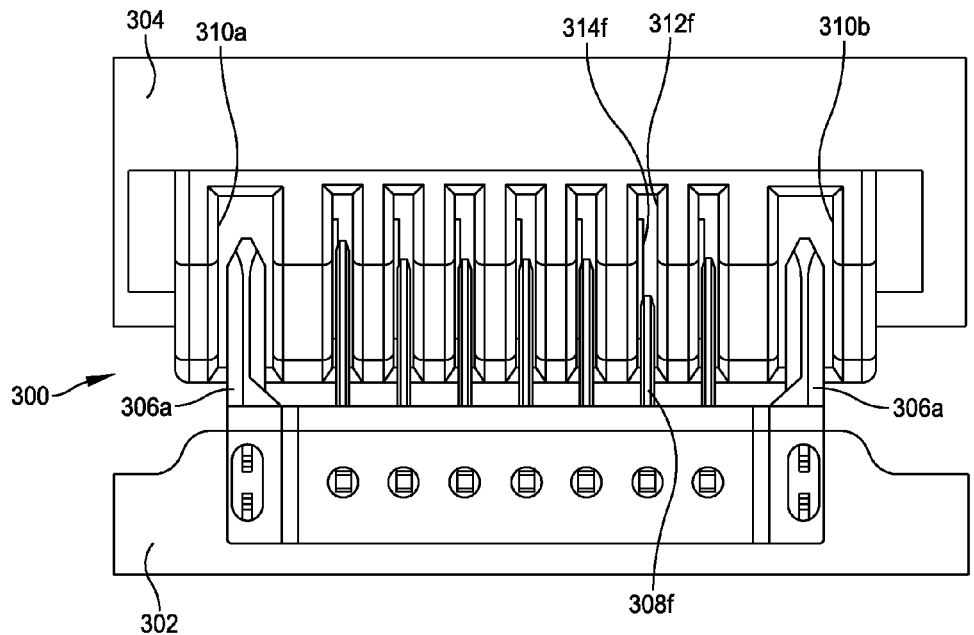
FIG. 11C is a cross-sectional view of the mating connector shown in a completely connected position.

Referring to FIGS. 11A-11C, a two-part, mating connector, generally indicated at 300, of an embodiment of the present disclosure is provided to connect the battery 14 to the UPS 10. FIG. 11A illustrates the mating connector 300 in a completely separated position prior to connection with one another. FIG. 11B illustrates the mating connector 300 in a partially connected position. FIG. 11C illustrates the mating connector 300 in a completely connected position. The mating connector includes a first part 302 mounted on the housing of the UPS 10 and a second part 304 mounted on the housing of the battery 18. In a certain embodiment, the first part 302 may embody connector 38 and the second part 304 may embody connector 54.

As shown, the first part 302 includes two larger guide pins 306a, 306b provided at the ends of the first part and seven smaller pins 308a, 308b, 308c, 308d, 308e, 308f, 308g disposed between the ground pins. The second part 304 includes two larger sockets 310a, 310b, which are shaped and sized to receive the guide pins 306a, 306b, respectively, and seven smaller sockets 312a, 312b, 312c, 312d, 312e, 312f, 312g, which are shaped and sized to receive the smaller pins 308a, 308b, 308c, 308d, 308e, 308f, 308g, respectively. Each pin 308b, 308c, 308d, 308e, 308g has a certain length, with one pin, i.e., pin 308f, having a length that is less than a length of the other pins. Pin 308a is slightly longer than pins 308b, 308c, 308d, 308e, 308g, in that this pin serves as a ground pin. The UPS 10 includes a detection circuit to detect mating of the shorter pin 308f with a corresponding socket 312f of the plurality of sockets and enable charging of the battery module 130 in response.

As shown, to eliminate issues associated with poor contact without using an extra detect switch, the shorter pin 308f is designed as an engagement positioning detection device or "ready pin." The pins 308 and the sockets 312 provide different contact timing by having different lengths. As shown in FIG. 11B, with a gap between the first part 302 and the second part 304 of the mating connector 300, the pins 308a, 308b, 308c, 308d, 308e, 308g are in contact with respective contacts 314a, 314b, 314c, 314d, 314e, 314g provided in the respective sockets 312a, 312b, 312c, 312d, 312e, 312g, but are not in a stable condition. The shorter pin 308f is not in contact with a contact 314f provided in its respective socket 312f, which will be detected by the detection circuit. The controller of the UPS receives a signal regarding the state of the contact and will prevent charging of the battery through the connector until proper mating occurs. When the "ready pin," i.e., pin 308f comes into contact with the contact 314f of its respective socket 312f, the other pins have reached a sufficient safety distance and reliable contact position. At this point, the controller of the UPS will enable charging of the battery.

Referring to FIGS. 12-19, the construction of an exemplary rotatable outlet of an embodiment of the present disclosure will be shown and described. Prior rotatable outlets suffer from reliability issues caused by a loosening of welded contact wires over time by excessive rotation of the outlet. The rotatable outlet of the present disclosure overcomes this disadvantage by providing a simple structure that is coaxial with series components and is easy to assemble. The rotatable outlet has a limited a range of rotation to avoid unlimited rotation of the outlet leading to intermittent connections, which can result in overheating and burning of wires connecting the rotatable outlet.

Figure 12:
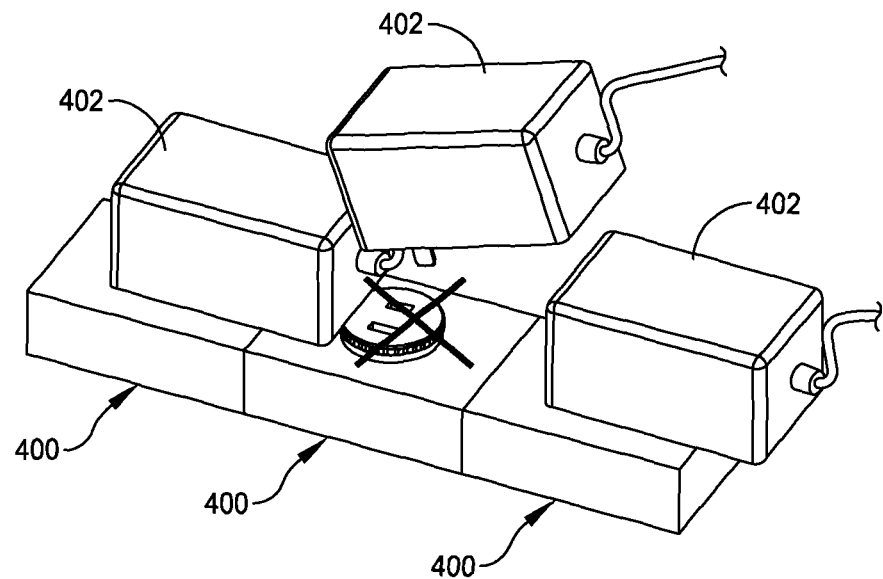
FIG. 12 is a perspective view of a plurality of rotatable outlets of an embodiment of the disclosure.
Figure 13:
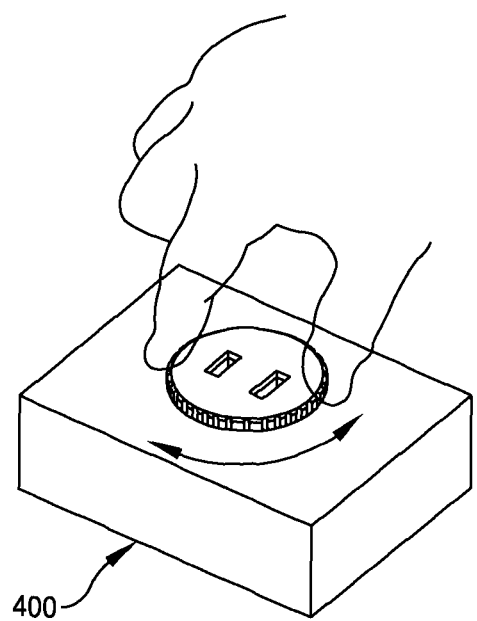
FIG. 13 is a perspective view of a single rotatable outlet.
Figure 14:
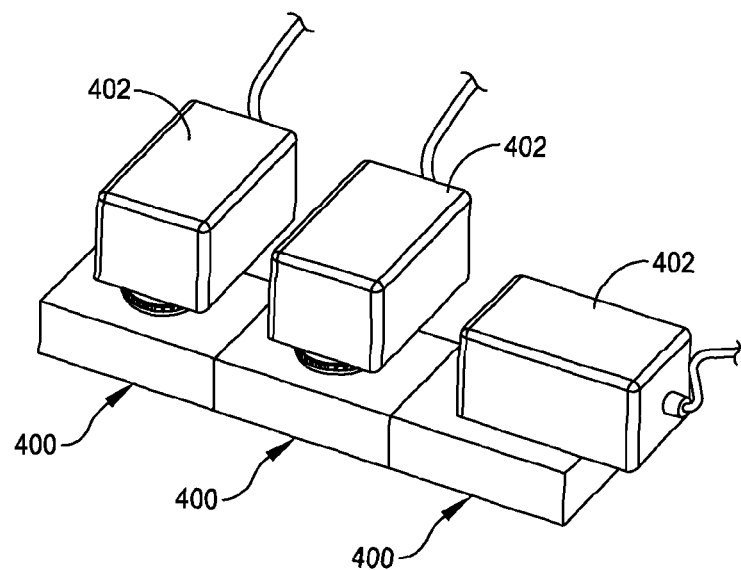
FIG. 14 is a perspective view of the plurality of rotatable outlets having the outlets rotated in such a manner to receive oversized plugs.

As shown in FIG. 12, there are three rotatable outlets, each generally indicated at 400, which are arranged in a row. In FIG. 12, it is difficult to connect multiple oversized plugs, each indicated at 402, without rotating the outlets a certain way. In FIG. 13, one of the outlets 400 is rotated ninety degrees to change the orientation of the outlet. As a result, which is shown in FIG. 14, the outlets 400 are configured to accommodate all of the oversized plugs 402, which was not possible with the orientation of the outlets shown in FIG. 12. The rotatable outlet 400 can be used on UPS and power strip products, and on connecters that require rotational functionality.

Figure 15:
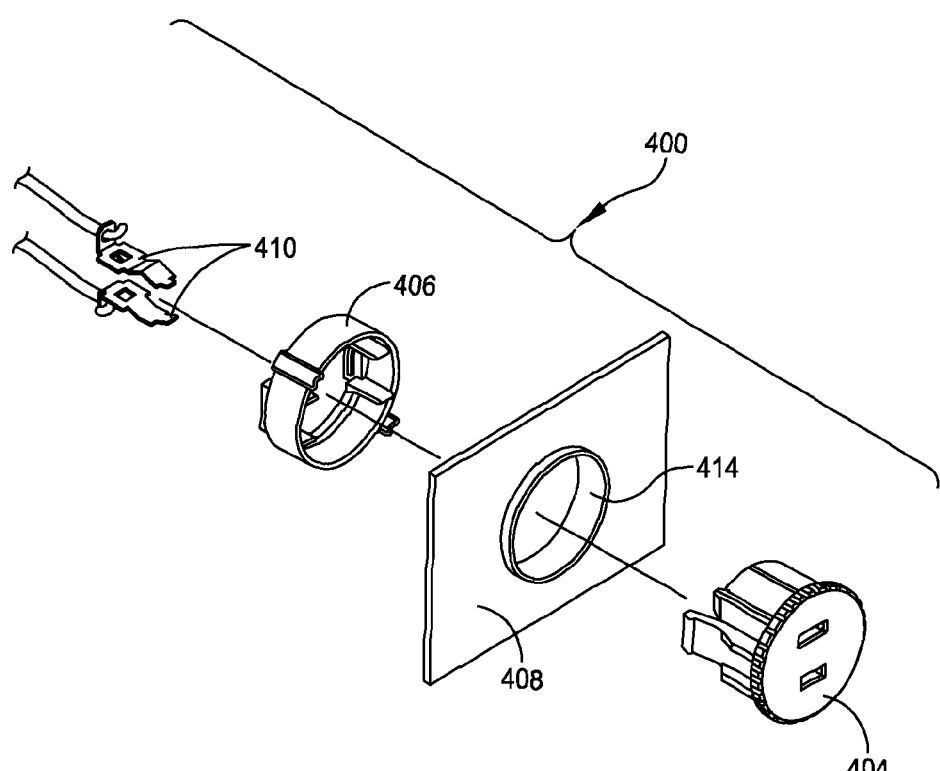
FIG. 15 is an exploded perspective view of a single rotatable outlet.
Figure 18A:
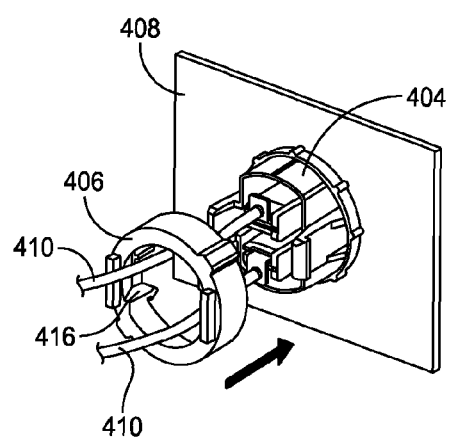
FIGS. 18A and 18B are perspective views of a retainer being secured to the rotatable outlet to secure the rotatable outlet to the housing of the UPS.
Figure 18B:
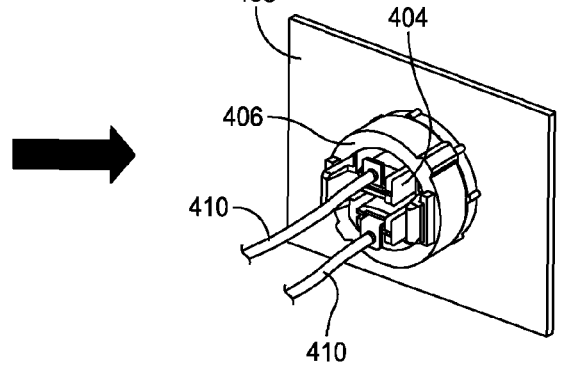

Referring to FIG. 15, the rotatable outlet 400 includes an outlet socket 404, a retainer 406 to secure the outlet socket to a wall 408, and two busbar wires, each indicated at 410, which are connected to the outlet socket. FIGS. 16A and 16B illustrate the connection of the two busbar wires 410 to the outlet socket 404. As shown, each wire 410 is secured within a respective receptacle, each indicated at 412, formed in a back of the outlet socket 404. FIGS. 17A and 17B illustrate the outlet socket 404 being inserted into an opening 414 formed in the wall 408. FIGS. 18A and 18B illustrate the outlet socket 404 being secured to the wall 408 by the retainer 406 by snap-fitting the retainer over the outlet socket. As shown, the retainer 406 is also secured to the wall 408 to prevent the retainer from rotating with respect to the wall. Thus, the outlet socket 404, once assembled, is rotatable with respect to the retainer 406, with the retainer having at least one inner wall 416 that limits the amount of rotation of the outlet socket. In the shown embodiment, the outlet socket 404 is configured to rotate ninety degrees.

Figure 19:
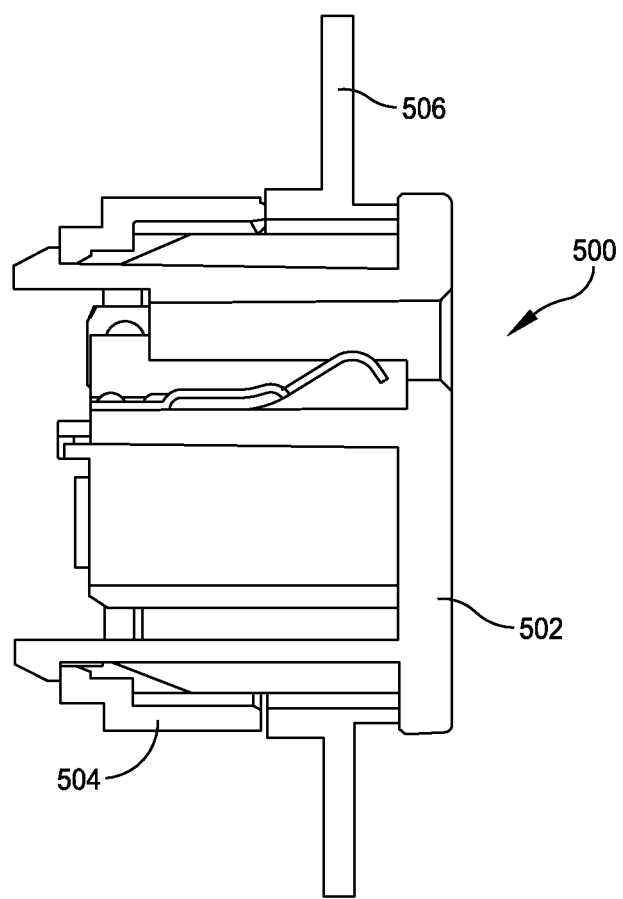
FIG. 19 is a cross-sectional view of a rotatable outlet of another embodiment of the disclosure.

FIG. 19 illustrates an alternate embodiment of a rotatable outlet, generally indicated at 500, having an outlet socket 502 and a round sleeve retainer 504 to secure the rotatable outlet to a wall 506. The retainer 504 has two hooking elements that provide alignment and reduce friction when rotating the outlet socket. With this arrangement, no screw fasteners are required.

At least some embodiments of UPS's described above provide backup power to a user in a home or office environment to power gateway equipment as well as other devices. In another mode of operation, the UPS further provides a portable, removable battery that can be used as an energy source, to charge portable devices while the user is traveling. The UPS ensures that mobile device power continuity is maintained.

In at least one embodiment a UPS provides convenient and compact charging power and backup power, while minimizing space consumed on a desktop. USB charging ports are built into both the battery, and the UPS providing the user with multiple charging options, while minimizing space consumed otherwise by bulky adapters, which must be carried with the mobile device. The use of rotatable AC power sockets for connection to adapter plugs typically provided with Internet gateway equipment (e.g., modem, WiFi router) provides additional flexibility. Although two such AC power sockets are shown, the UPS can be configured with any number of AC power sockets. This design enables a compact interface surface as the sockets can be brought close together without causing interference of the adapter plug bodies or wires.

In at least some embodiments a UPS is further provided with built-in surge suppression to protect equipment from lightning-generated surges, maximizing gateway equipment availability during weather events that are also likely to degrade AC input power. The portable, dockable battery may be recharged by the UPS whenever it is docked. When being used as a portable battery to recharge mobile devices, the battery itself can be recharged using any typical USB charger having a micro-USB connector. Instead of needing to purchase and carry multiple UPS, mobile battery and charging adapter devices, the UPS embodies a single, compact and convenient device having a universally adaptable battery that is portable and docks with the UPS. Moreover, instead of needing to purchase and carry multiple UPS, mobile battery and charging adapter devices, the UPS embodies a single, compact and convenient device having a universally adaptable battery that is portable and docks with the UPS.

In one embodiment, the portable, dockable mobile battery is normally docked in the UPS. The battery contains a plurality of battery cells in an array that includes a battery management system to regulate the charge voltage and monitor the cells for proper operation. When connected to the UPS by a two-part, mating UPS battery connector, the battery is charged by the UPS's battery charger, which is ready as an energy source in the event AC power is lost at an AC input connector. For example, when power is lost at an AC input connector, the UPS changes the position of a transfer switch to accept power from the inverter, whose energy source is the battery and power is maintained at a plurality of rotatable AC output sockets provided on the device. When the mobile battery is undocked from the UPS, the transfer switch is positioned to accept power from the surge protection circuits. In the event power is lost at the AC input connector, power is also lost at the rotatable AC output sockets.

A plurality of USB charging ports are supplied with power from a battery array management system, with the ports being located to provide outputs on both the mobile battery, and the UPS. These ports are managed by a USB controller to prevent overload from the connected devices, and provide a regulated output voltage as the output voltage of the battery array management system may vary with discharge. The mobile battery connector accepts power from a separate, outside mobile device charger to recharge the battery when undocked from the UPS. When sufficiently charged, the battery can be used to recharge mobile devices using the USB charging ports. The battery can be recharged using a typical USB charger having a micro-USB connector, such as those used by Android phones. Once docked, the battery is charged by the UPS.

In an alternative embodiment a UPS having capabilities described above may also include a network connection to couple to the Internet through associated gateway equipment to provide remote control, monitoring and management of the UPS.

In another embodiment, multiple batteries may be provided so that a charged battery can be used to power remote devices while another battery is inserted into the UPS. In another embodiment, the UPS may be configured with two battery compartments so that one battery remains in the UPS while the other battery is used to power remote devices. In another embodiment, the UPS can be configured with an internal battery to ensure that the UPS maintains its functionality while the removable battery is being charged or used to power remote devices.

In embodiments discussed above, input and output AC power connectors are of the type typically used with a 120V, 60 cycle AC power distribution system. In other embodiments, a UPS having capabilities described herein may be used with AC power distribution systems having other voltage levels, and other connectors and may be used with 50 cycle power systems as well.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. An uninterruptible power supply (UPS) comprising:
  a battery contained within a battery housing, the battery having at least one battery module within the battery housing and configured to provide battery power, the battery housing having a first connector mounted on the battery housing;
  a UPS housing having a battery compartment for removably containing the battery housing of the battery, the UPS housing having a second connector mounted within the battery compartment, the second connector being configured to mate with the first connector;
  a first input configured to receive input power from an AC power source; and
  at least one output configured to provide output AC power derived from the input power in a first mode of operation and configured to provide output power derived from the at least one battery module in a second mode of operation;
  wherein the battery housing has a third connector configured to be coupled to a mobile device to provide power to the mobile device, the battery being configured to charge the mobile device coupled to the third connector when the battery housing of the battery is disposed within the UPS housing and when the battery housing of the battery is removed from the battery compartment of the UPS housing.

2. The uninterruptible power supply of claim 1, wherein the third connector is a USB connector.

3. The uninterruptible power supply of claim 1, wherein the battery housing has a fourth connector configured to be coupled to a power source to charge the at least one battery module with the battery removed from the battery compartment.

4. The uninterruptible power supply of claim 1, wherein the at least one output includes a plurality of output connectors mounted to the housing, and wherein each of the plurality of output connectors is rotatable with respect to the UPS housing to receive a power cord at a plurality of orientations.

5. The uninterruptible power supply of claim 1, further comprising a plurality of mounting tabs, each of the plurality of mounting tabs being removably coupled to the UPS housing, and wherein the UPS housing is configured to receive each of the plurality of mounting tabs at one of a plurality of mounting locations on the UPS housing to selectively configure the uninterruptible power supply in one of a plurality of mounting orientations.

6. The uninterruptible power supply of claim 1, wherein the uninterruptible power supply is configured in the first mode of operation to provide charging power to the battery to charge the at least one battery module.

7. The uninterruptible power supply of claim 6, wherein one of the first connector and the second connector has a plurality of pins each having a length, and one of the first connector and the second connector includes a plurality of sockets for mating with the plurality of pins, wherein the length of one pin of the plurality of pins is less than the lengths of at least two pins of the plurality of pins, and wherein the uninterruptible power supply includes a detection circuit to detect mating of the one pin with a corresponding socket of the plurality of sockets and enable charging of the battery module in response.

8. A method of providing power to a plurality of devices comprising:
  operating an uninterruptible power supply (UPS) in a first mode of operation to provide AC power derived from input AC power to a first device;
  inserting a battery into a UPS housing of the uninterruptible power supply;
  operating the uninterruptible power supply in a second mode of operation to provide AC power derived from DC power from the battery to the first device;
  removing the battery from the housing; and with the battery removed from the UPS housing, charging a mobile device using the battery,
wherein the battery is configured to charge the mobile device when the battery housing of the battery is disposed within the UPS housing.

9. The method of claim 8, wherein charging a mobile device includes charging the mobile device using a USB connector mounted to a battery housing of the battery.

10. The method of claim 8, further comprising charging the battery while the battery is removed from the UPS housing.

11. The method of claim 8, wherein the uninterruptible power supply has at least one output connector mounted on the UPS housing of the uninterruptible power supply, and wherein the method further includes rotating the output connector with respect to the UPS housing from a first rotational position to a second rotational position, and coupling a power cord to the output connector.

12. The method of claim 8, wherein the UPS housing of the uninterruptible power supply includes a plurality of removable mounting tabs, and wherein the method further includes moving at least one of the plurality of mounting tabs from a first position on the UPS housing to a second position on the UPS housing, and mounting the UPS housing to a wall.

13. The method of claim 8, further comprising charging the battery in the first mode of operation.

14. The method of claim 13, wherein inserting a battery into the housing of the uninterruptible power supply includes mating a first connector having a plurality of pins each having a length with a second connector having a plurality of sockets, wherein one of the plurality of pins has a length that is less than the lengths of at least two pins of the plurality of pins, and wherein the method further comprises detecting that the one of the plurality of pins has mated with a corresponding socket of the plurality of sockets, and in response, charging the battery.

15. An uninterruptible power supply (UPS) comprising:
a battery contained within a battery housing, the battery having at least one battery module within the battery housing and configured to provide battery power, the battery housing having a first connector mounted on the battery housing;
a UPS housing having a battery compartment for removably containing the battery housing of the battery, the UPS housing having a second connector mounted within the battery compartment, the second connector being configured to mate with the first connector;
a first input configured to receive input power from an AC power source; and
at least one output configured to provide output AC power derived from the input power in a first mode of operation and configured to provide output power derived from the at least one battery module in a second mode of operation;
wherein the battery includes means for charging a mobile device with the battery removed from the UPS housing, the battery being configured to charge the mobile device coupled to the third connector when the battery housing of the battery is disposed within the UPS housing and when the battery housing of the battery is removed from the battery compartment of the UPS housing.

16. The uninterruptible power supply of claim 15, further comprising means for charging the battery in the first mode of operation.

17. The uninterruptible power supply of claim 16, further comprising means for detecting proper insertion of the battery into the battery housing and enabling charging of the battery module in response.

18. The uninterruptible power supply of claim 15, further comprising means for selectively configuring the uninterruptible supply in a desk top configuration and a wall mount configuration.

19. The uninterruptible power supply of claim 15, wherein the at least one output includes a plurality of output connectors mounted to the UPS housing, and wherein each of the plurality of output connectors is rotatable with respect to the UPS housing to receive a power cord at a plurality of orientations.

* * * * *